(12) United States Patent
Willett

(10) Patent No.: US 8,245,665 B2
(45) Date of Patent: Aug. 21, 2012

(54) COMBINED PET FOOD AND WATER DISPENSER

(76) Inventor: Shelley Sue Willett, New Braunfels, TX (US)

( * ) Notice: Subject to any disclaimer, the term of this patent is extended or adjusted under 35 U.S.C. 154(b) by 478 days.

(21) Appl. No.: 12/620,521

(22) Filed: Nov. 17, 2009

(65) Prior Publication Data
US 2010/0122660 A1 May 20, 2010

Related U.S. Application Data

(60) Provisional application No. 61/115,639, filed on Nov. 18, 2008.

(51) Int. Cl.
*A01K 1/10* (2006.01)
(52) U.S. Cl. .................................................. 119/51.5
(58) Field of Classification Search ............... 119/51.5, 119/52.1, 464; D30/129–131, 133
See application file for complete search history.

(56) References Cited

U.S. PATENT DOCUMENTS

| | | |
|---|---|---|
| 3,568,875 A | 3/1971 | Olan |
| 3,648,660 A | 3/1972 | Esquival |
| 3,763,826 A | 10/1973 | Portelli |
| 4,044,722 A | 8/1977 | Bradshaw |
| 4,069,793 A | 1/1978 | Gower |
| 4,079,699 A | 3/1978 | Longmore et al. |
| 4,176,767 A | 12/1979 | Franche, IV |
| 4,665,862 A | 5/1987 | Pitchford, Jr. |
| 4,688,520 A | 8/1987 | Parks |
| 4,756,277 A | 7/1988 | Peng |
| 4,782,790 A | 11/1988 | Batson |
| 4,800,844 A | 1/1989 | Van Gilst |
| 4,823,738 A | 4/1989 | Gold |
| 4,840,143 A | 6/1989 | Simon |
| 4,964,535 A | 10/1990 | Curwen |
| 4,966,099 A | 10/1990 | Arney |
| 5,009,310 A | 4/1991 | Finney |
| 5,016,572 A | 5/1991 | Weber et al. |
| 5,148,768 A | 9/1992 | Hinton |
| 5,165,365 A | 11/1992 | Thompson |
| 5,299,529 A | 4/1994 | Ramirez |
| 5,433,171 A | 7/1995 | Ewell |
| 5,488,927 A | 2/1996 | Lorenzana et al. |

(Continued)

OTHER PUBLICATIONS

Screen shots from the simpetsolutions.com website. Simpet Solutions, Inc. (Plymouth, IN). Showing the prior art pet feeders sold under the brand name "The Feeding Friend". Noted in specification ¶ [0003 ]. 7 pages.

(Continued)

*Primary Examiner* — Kimberly Berona
(74) *Attorney, Agent, or Firm* — Gordon G. Waggett, P.C.

(57) ABSTRACT

An on demand food and water dispenser for pets comprises a base structure, having a base floor and a surrounding substantially vertical base wall structure, capable of holding water; a food bowl, having a bowl floor and a surrounding substantially vertical bowl wall structure attached to the base floor within the base structure but not contacting the base wall structure, the bowl capable of holding food; and a dual-chambered container attached within the base structure but not contacting the base wall structure, capable of receiving, storing and dispensing on demand from a first chamber dry pet food into the food bowl and on demand from a second chamber water into the base structure. The base structure receives dispensed water from the second chamber to create a water-filled moat that inhibits crawling insects from accessing the food bowl or food stored in the first chamber of the dual chambered container.

5 Claims, 3 Drawing Sheets

U.S. PATENT DOCUMENTS

| | | | | |
|---|---|---|---|---|
| 5,730,082 | A | * | 3/1998 | Newman ............... 119/51.5 |
| 5,819,686 | A | * | 10/1998 | Credeur ............... 119/51.5 |
| 5,871,280 | A | | 2/1999 | Watters |
| 6,055,932 | A | | 5/2000 | Weber |
| 6,073,581 | A | | 6/2000 | Wang |
| 6,135,056 | A | | 10/2000 | Kuo |
| 6,142,099 | A | * | 11/2000 | Lange, Jr. ............... 119/51.5 |
| 6,145,473 | A | | 11/2000 | Keisner |
| 6,227,143 | B1 | | 5/2001 | Papkov |
| 6,378,460 | B1 | | 4/2002 | Skurdalsvold et al. |
| 6,467,428 | B1 | | 10/2002 | Andrisin et al. |
| 6,845,735 | B1 | | 1/2005 | Northrop et al. |
| 6,886,739 | B1 | | 5/2005 | Tsengas |
| 6,988,464 | B1 | | 1/2006 | Rutledge |
| 6,988,465 | B2 | | 1/2006 | Park |
| 7,270,081 | B2 | | 9/2007 | Park |
| D552,802 | S | | 10/2007 | Kuster |
| 7,284,499 | B1 | | 10/2007 | Kuster |
| D563,605 | S | | 3/2008 | Morris et al. |
| 7,337,746 | B2 | | 3/2008 | Clark et al. |
| D602,653 | S | | 10/2009 | Mendenhall |
| 2002/0096120 | A1 | | 7/2002 | Busha |
| 2003/0015144 | A1 | | 1/2003 | Bennett et al. |
| 2003/0026875 | A1 | | 2/2003 | Aguilar et al. |
| 2003/0106498 | A1 | | 6/2003 | Mersits et al. |
| 2003/0116093 | A1 | | 6/2003 | Springett |
| 2004/0134438 | A1 | | 7/2004 | Ticktin |
| 2005/0051566 | A1 | | 3/2005 | Leykin et al. |
| 2005/0252457 | A1 | | 11/2005 | Morosin et al. |
| 2006/0060153 | A1 | | 3/2006 | Washington et al. |
| 2006/0283397 | A1 | | 12/2006 | Loeffelholz |
| 2007/0095296 | A1 | | 5/2007 | Zuccara |
| 2007/0095297 | A1 | | 5/2007 | Boyd |
| 2007/0107667 | A1 | | 5/2007 | Morris |
| 2007/0227461 | A1 | | 10/2007 | Chern |

OTHER PUBLICATIONS

Prior art Fool-A-Bug® bowl offered by the Petmate® company (Doskocil Manufacturing Company, Inc., Arlington, Texas). 1-page screen shot from the petmate.com website. Noted in specification ¶ [0008].

Best, Rody L., et al., "Evaluation of Fool-a-bug® V-m Protector as an Exclusion Device Against the Red Imported Fire Ant and the German Cockroach". Available online http:// fireant. tamu. edu/ research/arr/ category/ non-chemical/97-99pg65/97-99pg65.pdf. 5 pages. Although the article is not dated, it appears to relate to testing performed on this bowl in late 1998- early 1999.

Screen shots from the petmate.com website regarding the prior art LeBistro brand of Feeders and Waterers. 4 pages. http:// www. petmate. com/Products/LeBistro-Feeder-and-Waterer_24302.aspx. Noted in specification ¶ [0009].

2008 Petmate Lifestyles Brochure. Available online from http: / /www. petmate. com/catalogs.aspx: http: //72. 249. 40. 247/ pdf/ 2008_Petmate_Lifestyles_Brochure.pdf. 2 pages.

2009 Mass Petmate Catalog. Available online from http: / /www. petmate. com/catalogs.aspx: http: // 72.249 .40. 247/pdf12009_ Mass_Petmate_Catalog.pdf. 28 pages. See pp. 20-25, 28.

2009 Petmate Specialty Catalog. Available online from http: //www. petmate. com/catalogs.aspx: http:// 72. 249. 40. 2471pdf12009_ Petmate_Specialty_Catalog.pdf. 32 pages. See pp. 23-29, 32.

Screenshots from website of Perfectpetfeeder.com regarding the prior art "Perfect Petfeeder" brand automatic feeder sold by Pillar Pet Products, Inc. (Fall City, WA) (perfectpetfeeder.com). 2 pages. Available online at http: // www. perfectpetfeeder. com/. Noted in specification ¶ [0009].

Dog News Today, "Keep Ants Out of Your Dogs Food", Feb. 4, 2007. 2 pages. Available online at http: // dognewstoday. blogspot. com/ 2007/02/keep-ants-out-of-your-dogs-food.html.

PCT/US2009/064901 (counterpart to present application): PCT Written Opinion of the International Searching Authority dated Jun. 14, 2010 (3 pages).

PCT/US2009/064901 (counterpart to present application): International Search Report, published Sep. 12, 2010, 3 pages. Cites 4 references, each relevant to claims 1-6: Kuster US 7284499 (cited in prior IDS) as a "Y" reference; Busha US 20020096120 (noted above) as a "Y" reference; Simon US 4840143 (cited in prior IDS) as an "A" reference; and Springett 20020096120 (noted above) as an "A" reference.

* cited by examiner

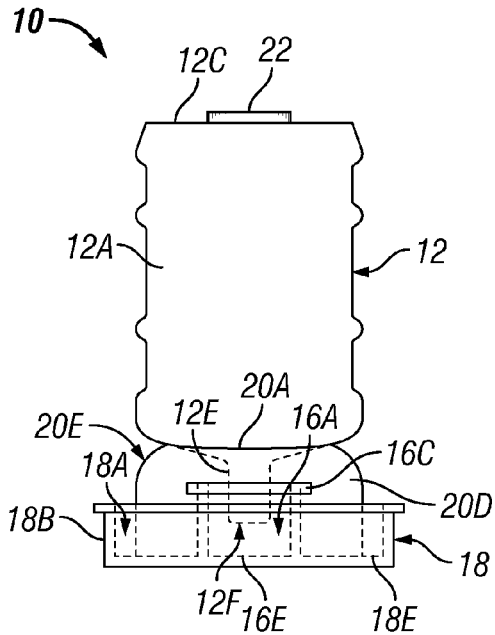
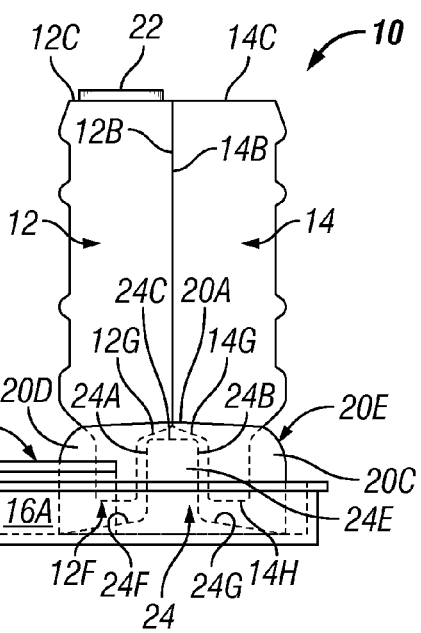
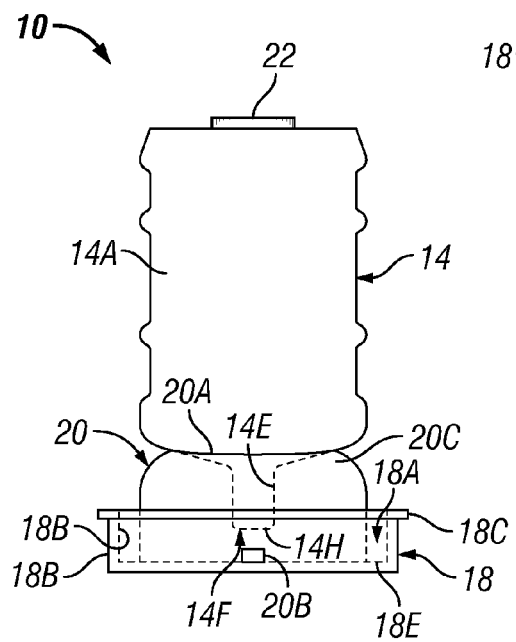

COMBINED PET FOOD AND WATER DISPENSER

CROSS-REFERENCE TO RELATED APPLICATIONS

This application claims the benefit of the filing date of and priority to U.S. Provisional Application Ser. No. 61/115,639 entitled "Combined Dog or Cat Food and Water Dispenser" and filed Nov. 18, 2008, Confirmation No. 7351. Said provisional application is incorporated by reference herein.

STATEMENT REGARDING FEDERALLY SPONSORED RESEARCH OR DEVELOPMENT

Not Applicable.

BACKGROUND OF THE INVENTION

1. Field of Use

This invention pertains to food and water dispensers used for animals. More particularly, the invention pertains to a combined food and water dispenser that is particularly advantageous for use with pets, such as dogs and cats, to prevent insects from crawling into the food bowl.

2. Description of the Related Art

Pet owners have a need to protect their pets' food (in food bowl) from intrusion by insects, such as ants, and other pests for example. An assortment of pet or animal food dispensers exist in the prior art, some of which are directed to minimizing insect intrusion into the pet's food bowl.

For example, one moat style apparatus directed to preventing crawling insects from accessing a pet food bowl is found in U.S. Pat. No. 7,284,499 (Kuster) entitled: "Combination water and food dispenser for pets", which discloses a water and food dispenser for pets comprising a first (water) dish member and a second (food) dish member, wherein the second dish member is stacked above the first dish member. The base or pillar supporting the second (food) dish member is positioning in within the first (water) dish member to provide a moat to permit the water in the first dish to surround the base of the food dish. The first dish member has means for automatically replenishing water within the dish as the water is either consumed or evaporates. The second dish member comprises a food storage reservoir which gravitationally dispenses food into the second dish member. The water and food dispenser may be configured such that the position of the second dish member may be rotated about a vertical axis with respect to the first dish member. Similarly, U.S. Design Pat. No. D552802 (Kuster) depicts the ornamental features of this device. Such system is believed to be sold online (simpetsolutions.com website) by Simpet Solutions, Inc. (Plymouth, Ind.) under the brand name "The Feeding Friend". However, this system requires that the food bowl be elevated above the water bowl.

Another moat style anti-insect food bowl system is described in U.S. Application Serial No. 20030106498 (Mersits et al.) entitled: "Pet food serving apparatus and methods", directed to a pet food apparatus for protecting pet food containers from crawling insects. The food containers are located on an upper tray, elevated above a moat tray, which contains water or some other liquid or attractant. The liquid attracts the crawling insects that have come to the vicinity of the pet food apparatus and the insects get trapped in the liquid or other attractant. One or more vertical support structures support the upper tray above the moat tray. The support structures are configured to enable a user to set the height of the elevated tray relative to the moat tray or the ground. The elevated tray can also be configured with cutout or recessed sections to fit matching pet food bowls. A built-in water dispenser can automatically maintain the fluid level in the moat tray. However, this system requires that the food bowl be elevated above the water bowl.

Another moat style approach to insect deterrence at a pet food bowl is U.S. Pat. No. 4,966,099 (Arney) entitled: "Pet feeder and method for feeding" which describes a pet feeder comprising a base member, an upstanding support rod having one end secured to the base member, a disk-like support plate secured to the other end of the support rod, a liquid receptacle secured to the support rod intermediate the ends thereof; the support plate has a plurality of radially spaced openings therein; a pet food dish having a plurality of depending feet spaced and arranged so as to be engagable with the openings in the support plate is provided, and each of the feet have an enlargement thereon for retaining the feet in the openings in the support plate; the food dish has a diameter slightly greater than the diameter of the support plate so as to extend radially beyond the edge of the support plate; placing corn oil in the liquid receptacle prevents ants and other crawling insects from reaching the support plate and/or the food dish secured thereon. However, this system requires that the food bowl be elevated above the water bowl.

Also, U.S. Pat. No. 5,165,365 (Thompson) entitled: "Ant proof pet feeder apparatus" discloses a pet feeder that includes a base, with a removable first and second tube structure arranged to capture a fluid container therebetween for means of replenishment and maintenance of the container in use. A feed dish is mounted upon an upper terminal end of the second tube. A modification of the invention includes replaceable weight members mounted within the base member for ease of disassembly of the structure during transport and storage of the organization. The fluid container receives a liquid oil and soap mixture therewithin of a non-toxic composition to discourage by repulsion or entrapment of various crawling insects attempting to gain access to the overlying feed dish container. The overlying feed dish container can contain a partitions to divide the container into a plurality of compartments for use in containing fluid (water) and food within the same container structure. This reference also notes a prior art feed bowl used by pets wherein an elevated bowl positioned at an upper end of a post portion includes an underlying flat circular disc, with a moat positioned therebelow, to include a sticky substance mounted on the disc positioned within the moat to discourage insects and their traverse to the upper bowl.

U.S. Design Pat. No. D602653 (Mendenhall) entitled: "Anti-ant pet feeder with convex-rimmed removable bowl" depicts an ornamental design for a food bowl/water bowl combination.

Additionally, stand-alone pet food/water bowls have been designed with non-skid rubber feet systems which elevate the bowl just off of the floor to disrupt crawling insects' navigation system to thereby deter bugs from entering the bowl. One such product is the Fool-A-Bug® bowl offered by the Petmate® company (Doskocil Manufacturing Company, Inc., Arlington, Tex.) (petmate.com website).

Automatic pet feeders and water dispensers exist in the prior art and are commercially available in number of advantageous designs. For example, the Petmate® company offers automatic food and water dispensers under the LeBistro® trademark (petmate.com website). The benefit of these types of feeders include convenience and practicality, as well as a way to provide the pet with food and water while the owners are away. The LeBistro® brand automatic waterers employ essentially an inverted water cooler type bottle/container to hold the water. The bottle (full with water) is then inverted so that the neck of the water bottle enters into the base of the waterer device. The water is able to proceed by gravity flow to an attached water bowl where the pet can access the water. As water is consumed from the water bowl, the water bowl water level is replenished "on demand" by water from the container. The waterer can be treated with a suitable antimicrobial compound, such as the Microban® antimicrobial product offered by the Petmate® company, to help prevent the growth of stain and odor causing bacteria, mold and mildew. Similarly, the LeBistro® brand automatic feeders use a vertical capped chamber or reservoir to hold the food (dry pelletized pet food). The food can then cascade by gravity into an open bowl where the pet can then access the food. As the pet accesses the food, the gravity flow of food from the food reservoir replenishes the bowl in an "on demand" fashion. The cap on the top of the chamber can be removed to facilitate refilling of the food chamber. The Petmate® company also offers a combination unit where a food bowl and water bowl are joined together side-by-side as a single unit and the water bowl is provided with a self-watering reservoir. Other varieties of automatic pet feeders provide portion-controlled meals or snacks via electronic dispensing systems, such as the "Perfect Petfeeder" brand automatic feeder sold by Pillar Pet Products, Inc. (Fall City, Wash.) (perfectpetfeeder.com). The automatic feeders of these prior art varieties constantly maintains food in the open bowl.

These automatic feeders are typically constructed of a suitably strong plastic material, such as a durable polypropylene, and preferably FDA approved plastics for those portions contacting the food or water. Additionally, for example, the "Perfect Petfeeder" brand automatic feeder employs heavy gauge, hypo-allergenic stainless steel that can be cleaned in a dishwasher if desired for those portions of the feeder contacting the food. Other suitable materials could be employed, including glass or ceramic.

Additionally, an assortment of pet or animal food dispensers exist in the prior art that automatically dispense food and/or water into respective food or water feeding dishes. For example, U.S. Application Serial No. 2007095297 (Boyd) entitled: "Proximity activated pet fountain", discloses a pet fountain wherein water or pet food stored in a reservoir is dispensed from the reservoir and delivered to a receptacle accessible to the pet only on demand initiated by the physical presence of the pet in the proximity of the fountain.

U.S. Pat. No. 6,467,428 (Andrisin et al.) discloses a filtered water system for pets that includes two (2) gravity feed units, one (1) of which dispenses filtered water and the other which dispenses dry pet food. The filtered water gravity feed unit includes a breather tube such that when the water level drops below the breather tube level in the water bowl, air enters into the breather tube equalizing the pressure inside and outside of the water bottle. This allows water to fill the water bowl to a level where the pressure inside the water bottle is equal to or less than the pressure on the water in the water bowl and water stops flowing. The water gravity feed unit includes a filter capable of removing some contaminants from the water.

U.S. Pat. No. 6,145,473 (Keisner) entitled: "Pet food and water dispenser", discloses a pet food dispenser comprising a base, a bowl mounted on the base for retaining a quantity of a substance to be dispensed, a reservoir mounted adjacent one side of the base and operable to deliver a desired substance into the bowl, and a cover movable into and out of a position to cover the bowl.

U.S. Pat. No. 5,488,927 (Lorenzana et al.) entitled: "Animal food dish and water dispenser", discloses an animal food dish and water dispenser which includes first and second cup shaped receptacles spaced apart in a base member having an upwardly projecting barrier separating the two receptacles and supporting an inverted water reservoir bottle centrally on the base member to supply water to one of the receptacles.

U.S. Pat. No. 5,433,171 (Ewell) entitled: "Automatic pet food dispenser" discloses an automatic animal feeding apparatus having an exterior cabinet, a base member supporting the exterior cabinet, a water tank disposed within the exterior cabinet, and a food hopper disposed within the exterior cabinet and positioned adjacent to the water tank. A food bowl and a water bowl are positioned substantially on a top surface of the base member. In addition, there is a first pressure sensing mechanism for generating a first analog signal corresponding to the weight of the water bowl, and a second pressure sensing mechanism for generating a second analog signal corresponding to the weight of the food bowl.

U.S. Pat. No. 5,299,529 (Ramirez) entitled: "Automatic feeder for dogs and other animals" discloses an automatic feeder includes a computerized dispenser for dispensing different programmed quantities of food for each meal (e.g., 1-10 cups of dry food) to an animal at up to ten programmed times. The computerized dispenser includes food-dispensing components for dispensing food and, preferably, water-dispensing components for dispensing water. The computerized dispenser also includes a programmed microcomputer and integrated control circuitry operatively coupled to the food-dispensing components for automatically controlling the food-dispensing components in order to dispense different programmed quantities of food for each meal at programmed times. According to a major aspect of the invention, the integrated control circuitry includes components (e.g., a digital voice circuit) for recording and playing audio in order to enable an owner to record a message (e.g., a 30-second message) for automatic playback at preprogrammed times, normally just ahead of feeding time. The control circuitry preferably includes a telephone interface that enables remote control of the pet feeder by conventional telephone. It may include a video telephone interface and a personal computer interface. A battery backup protects against power failures.

U.S. Pat. No. 4,840,143 (Simon) entitled: "Pet food dispenser", discloses storage and dispensing apparatus for dry or liquid pet food of the type including a serving tray and a generally cylindrical storage container detachably secured to the tray so as to extend axially thereabove. The tray is provided with a generally circular opening for receiving the bottom of the storage container, and a flange projects radially into the opening. The flange is interrupted over a predetermined circumferential arc. The bottom of the storage container has a skirt portion that flairs downwardly and outwardly and has an outside diameter which is larger than the inside diameter of the interrupted flange. On the flaired skirt, a pair of diametrically opposed lugs project radially outwardly and each lug has a circumferential dimension which is smaller than the circumferential extent of the interruption in the tray flange. Immediately above the flaired skirt there is provided a downwardly facing annular seat. In order to mount the storage container to the tray, one of the lugs is aligned with the interruption in the tray flange and the storage container is tilted so that the other lug extends under the tray flange. The storage container is then pressed towards the tray so that the flaired skirt portion snaps past the tray flange, so that the flange is captured between the skirt portion and the storage container annular seat. Rotating the storage container with respect to the tray so as to place both lugs under the tray flange will then lock the storage container against withdrawal from the serving tray.

U.S. Pat. No. 4,800,844 (Van Gilst) entitled: "Dispensing device for feed or water", discloses a dispensing device (for dispensing food or water for animals or fowl includes a dispensing unit having a reservoir and a neck, and a base unit having a pan and a neck-receiving collar. When liquid is dispensed, the outlet of the dispensing unit is abutted against the inside bottom surface of the pan, and a first effective opening is provided between the outlet and the inside bottom surface of the pan because the outlet is disposed at an angle to the inside bottom surface. When the dispensing device is used for dry feed, the outlet of the dispensing unit is positioned with a second, and larger, effective opening between the outlet and the inside bottom surface of the pan.

U.S. Patent No. Application Serial No. 2005252457 (Morosin et al.) entitled: "Automated pet food dispenser", discloses an automated pet food dispenser is described that comprises a rotatable food chamber with multiple cavities to hold food for different meals, a base unit for supporting the food chamber, a rotary mechanism to rotate the food chamber relative to the base, and a timing mechanism that indicates feeding times. At feeding times, the rotary mechanism rotates the food chamber to position a selected cavity such that food stored in the cavity may drop out of an opening in the cavity, preferably through a chute or channel, and into a feeding station positioned below. A control unit in the automated pet food dispenser may be configured to initiate anti-jamming procedures if food becomes jammed and obstructs the rotation of the food chamber. In various embodiments, feeding times may be set to occur at fixed time intervals or may be set to occur at times set on a programmable clock on the base unit. In some embodiments, a recording mechanism in the automated pet food dispenser allows a user to record an audio clip such as a voice message, music, or other selected sound for calling a pet to eat at feeding times.

U.S. Pat. No. 6,988,465 (Park) entitled: "Automatic pet food dispensing device" discloses an automatic pet food dispensing device having a container that stores pet food, a circular pipe attached below the container, a dispenser rotatably received in the circular pipe, a motor that rotates the dispenser, and one or more dispensing spouts connected to the circular pipe is provided. The dispenser includes a shaft with a rectangular cross section and two or more circular dispensing discs fixed to the shaft, and each of the dispensing discs has an arc recess positioned opposite of each other. The dispensing discs have evenly spaced grooves cut out around the circumference of each disc and evenly spaced convex bumps slightly protruding upward.

U.S. Pat. No. 6,845,735 (Northrop et al.) (Doskocil Manufacturing Company, Inc.) entitled: "Pet feeder", discloses a pet feeder for dispensing a supply of pet food includes a food dish and a food storage reservoir. The food storage reservoir is disposed adjacent the food dish and is adapted for holding a supply of the food. A top wall and a floor define the reservoir. The food dish is defined by a sidewall and a floor and has an open top to allow pets access to the food dish. The reservoir floor and the food dish floor form a continuous and downwardly sloping floor to gravitally direct pet food from the storage reservoir into the food dish. An agitator is disposed inside the reservoir. The agitator includes an arm secured to a disc for stirring the food to reduce food stagnation inside said reservoir. A food level sensor is further included in the reservoir to alert the user when the food level in the reservoir is empty or is approaching empty.

U.S. Pat. No. 6,378,460 (Skurdalsvold et al.) (Doskocil Manufacturing Company, Inc.) entitled: "Nestable pet food dispensers", discloses a pet food dispenser selectively nestable to a similarly configured dispenser for locking a pair of dispensers together for shipping and display purposes. The dispenser includes a reservoir for storing food. A cap is provided for the reservoir. A base is connected to the reservoir which includes a bowl for receiving food from the reservoir. The cap includes an extension for nestably mating with the bowl of another dispenser.

U.S. Pat. No. 6,227,143 (Papkov) entitled: "Automatic dry pet food dispenser" discloses an automatic dry pet food dispenser releases measured quantities of dry pet food at predetermined timed intervals over a several day period. The housing encloses a hopper, covered with a lockable lid. Underneath the hopper, a trough is pivotally mounted to the housing at its rear end. A front support of the trough is provided by a camshaft with several equally spaced cams, driven by a motor mechanism. The slope of the trough combined with its oscillating movement about the horizontal axis, caused by the rotating camshaft ensure the discharge of the material through the open front end of the trough into an external container. A timer controls the food quantity released at a single cycle and the schedule of operation U.S. Pat. No. 6,135,056 (Kuo) entitled: "Automatic pet food dispenser at definite times and for a definite quantity", discloses an automatic pet food dispenser at preset times and for a definite quantity includes a dispenser body, a food storing tank, a funnel-shaped receiver, a transporting mechanism. The transporting mechanism consists of a food pipe and a screw conveyer deposited in the food pipe and rotated by a motor for transporting pet food by the screw conveyer to let the food fall down from the storing tank, through the funnel-shaped receiver, and a timer for presetting times of start and stop and thus the period of operating time of the motor. The dispenser body has a food exit formed in a bottom wall and connected to the lower end of the food pipe, and a food trough movably provided in the bottom portion of the dispenser body to pulled out thereof to receive pet food falling down from the food exit.

U.S. Pat. No. 6,055,932 (Weber) entitled: "Pet food dispenser adapter", discloses a pet or animal food dispenser and dispenser adapter for securing pet food containers having a circular discharge openings to pet food dispenser trays having rectangular food container mounting portions.

U.S. Pat. No. 5,016,572 (Weber) entitled: "Pet food package and dispenser", discloses a pet or animal food package and dispenser includes a food container having a bottom portion which defines a discharge opening. A removable closure or seal is secured to the container for retaining a pet food product therein. A dispensing tray includes a forward portion defining a feeding area and a rear portion defining a container mounting area. The portions are joined by a sloping ramp. A cooperating track and groove arrangement on the container and tray removably mount the container to the dispensing tray.

As such, there exists a need to have a simple, automatic pet feeder and waterer combination that presents the food and water at the same level while also discouraging crawling insects from accessing the food serving bowl or food storage container.

SUMMARY OF INVENTION

In one embodiment of the present invention there is disclosed and described an on demand food and water dispenser for pets comprising: a base structure, having a base floor and a surrounding substantially vertical base wall structure, capable of holding water; a food bowl, having a bowl floor and a surrounding substantially vertical bowl wall structure attached to the base floor within the base structure but not contacting the base wall structure, the bowl capable of holding food; and a dual-chambered container attached within the base structure but not contacting the base wall structure, capable of receiving, storing and dispensing on demand from a first chamber dry pet food into the food bowl and on demand from a second chamber water into the base structure. When the base structure receives dispensed water from the second chamber, the water in the base structure surrounds the walled food bowl and the dual chambered container to create a water-filled moat that inhibits crawling insects from accessing the food bowl or food stored in the first chamber of the dual chambered container.

In another embodiment, there is described a combination food and water dispenser for pets comprising: a food container, a water bowl, a food bowl, a vertically extending base receiver unit having a base water receiving chamber and a base food receiving chamber. The food container is capable of receiving, storing and dispensing dry pet food and comprises a food container outer surface, a food container interior space, a food container top side, a food container bottom side, and a first food container opening located on the food container bottom side to permit entry into or egress from the food container interior space of the dry pet food. The water container is capable of receiving, storing and dispensing water and comprises a water container outer surface, a water container interior space, a water container top side, a water container bottom side, and a water container opening to permit entry into or egress from the water container interior space of water. The water bowl has a water bowl floor and a contiguous substantially vertical water bowl outer wall member fixably attached to the water bowl floor member to create a water reservoir capable of receiving and holding dispensed water therein at a constant water level. The food bowl has a food bowl floor and a contiguous substantially vertical food bowl outer wall member fixably attached to the water bowl floor member to create a food reservoir capable of receiving and holding dispensed food therein, the food bowl being located within the water bowl in a position that does not permit the food bowl to contact the water bowl outer wall member. The food bowl wall member has a height greater than that of the water level in the water bowl. The vertically extending base receiver unit is attached to the water bowl floor in a position that does not permit the base receiver unit to contact the water bowl outer wall member. The base receiver unit comprises a base water receiving chamber for receiving and housing the water container and for directing water, via gravity flow, from the water container into the water bowl, and a base food receiving chamber for receiving and housing the food container and for directing food, via gravity flow, from the first food container opening into the food bowl.

The combination food and water dispenser food container can further comprise a second food container opening located on the food container top side and a removable lid to cover the second food container opening, to permit dry food to be added to the food container.

The combination food and water dispenser first food container opening can further comprise a food container neck with food container neck opening for discharging food out of the food container. The water container opening can further comprise a water container neck with water container neck opening.

In one embodiment, the food container has a food container front side convex shaped surface and a food container back side flat surface so that the overall shape of the food container is substantially that of a half-hollow cylinder. The water container has a water container front side convex shaped surface and a water container back side flat surface so that the overall shape of the water container is substantially that of a half-hollow cylinder. The food container and the water container are housed, back side-to-back side to resemble a full cylinder, when the water container and the food container are housed in the base receiver.

In another embodiment of the present invention the combination food and water dispenser food container and water container are attached together in a unitary construction that can be housed in, or removed from, the base receiver unit.

The top of the water bowl wall member can further comprise a water bowl lip and the top of the food bowl member can further comprise a food bowl lip.

BRIEF SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 3 illustrates a front view of an embodiment of a combined animal food and water dispenser according the present invention.

FIG. 4 illustrates a side view of an embodiment of a combined animal food and water dispenser according the present invention.

FIG. 6 illustrates a rear view of an embodiment of a combined animal food and water dispenser according the present invention.

Figure 1:
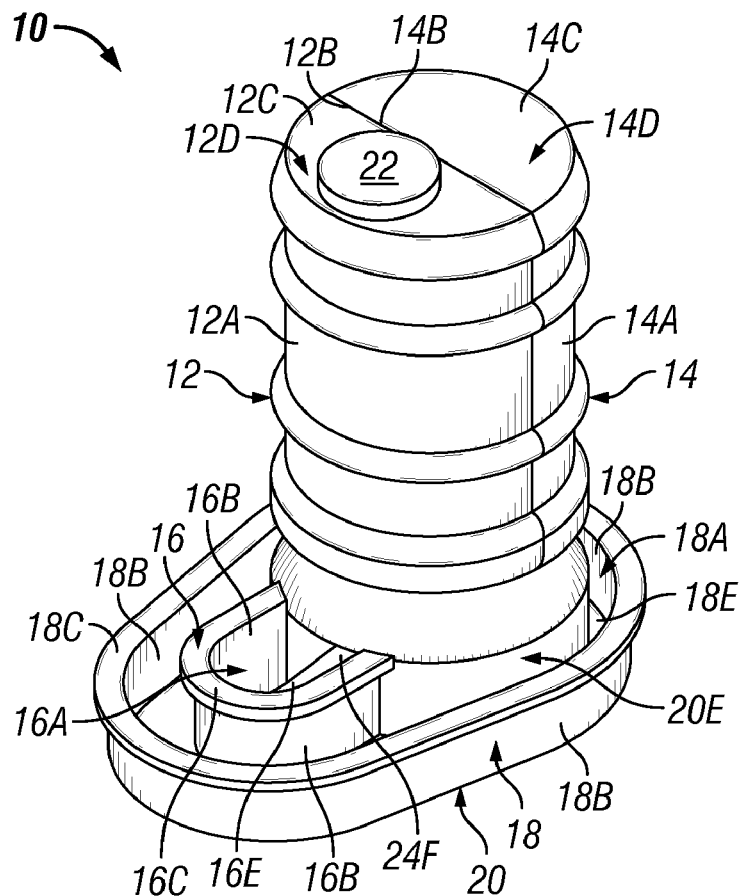
FIG. 1 illustrates a perspective view of an embodiment of a combined animal food and water dispenser according the present invention.

It will be appreciated that the foregoing drawings illustrate only certain embodiments of the invention and that numerous other variations may be created within the scope of the described invention.

DETAILED DESCRIPTION OF INVENTION

The above general description and the following detailed description are merely illustrative of the subject invention and additional modes, advantages and particulars of this invention will be readily suggested to those skilled in the art without departing from the spirit and scope of the invention.

The present invention is a combined animal food and water dispenser of varying sizes depending on the number and size of the animals being fed and watered. The invention is ideal for use with pets, such as dogs or cats, and the size of the dual dispenser would vary depending on how many dogs or cats, or the size of dogs or cats, that are being fed and watered. For example, the dual dispenser could have a five gallon overall capacity of which half (2.5 gallons capacity) is for the desired dog/cat food (e.g., a dry pelletized food) and in which the other half (2.5 gallons capacity) is for water. In this example, the volume is divided evenly between food and water, but other volume ratios could be employed. In one embodiment, the dual dispenser comprises two separate dispenser containers; one dispenser container for storing the food to be dispensed into a food bowl and one dispenser container for storing the water to be dispensed into a water bowl. In another embodiment, the food and water storage dispenser container is of unitary construction wherein it contains two separate compartments for storing the food and water, respectively that will be dispensed.

In one embodiment of the invention, the combined food and water dispenser will dispense food and water using gravity. The food will be dispensed into the middle of the food bowl and the water will fill a channel surrounding the food bowl thereby creating a water-filled moat around the food bowl. This moat prevents or otherwise inhibits ants and other crawling insects from reaching the food. It is a combining of current dog food watering jugs and feeding jugs available at local pet stores into a single unit designed to permit the dispensed water to fill a moat-like bowl surrounding the food bowl.

In another embodiment of the invention, a dog/cat food and water dispenser includes the following elements:

a) A plastic water jug, like the ones currently available on the market, but divided down the middle to hold food in one compartment and water in the other compartment.

b) A plastic reservoir base for the plastic jug (dog/cat food and water dispenser) to connect to and sit on top of the base to allow for gravity dispensing of the food and water into the base. The base will have a plastic wall to separate the water and the food, so they do not mix and will be of various sizes and dimensions depending on the size of the dog food and water dispenser. The water reservoir will surround the food reservoir providing a moat around the food to prevent ants and other crawling insects from getting to the food. The dimensions of the base will be based on the size of the feeder and water container and will be determined due to design concerns, as well as physics.

c) A plastic lid to cover the opening of the food compartment to protect the dog/cat food from the elements and insects.

In another embodiment of the invention, a five gallon jug has a divider to separate the water and the food and a designed base with a reservoir for the water and a reservoir for the food. The water will create a moat around the food reservoir to prevent ants and other crawling insects from getting to the food.

FIG. 1 depicts a perspective view of an embodiment of the animal food and water dispenser invention (10). Containing 4 separate parts, including the base (20) with a tray for the food (16) and a tray for the water (18) and the two halves of the dispensing jug, the one for food (12) and one for the water (14) and the lid for the dog food dispenser (22).

Figure 2:
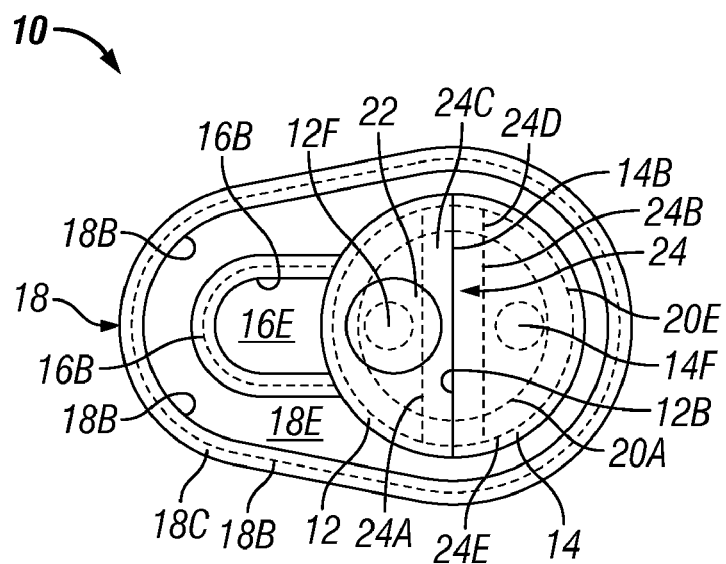
FIG. 2 illustrates a top view of an embodiment of a combined animal food and water dispenser according the present invention.

FIG. 2 is a top view of the invention (10) showing the 4 separate parts, including the base (20) with a tray for the food (16) and a tray for the water (18) and the two halves of the dispensing jug, the one for food (12) and one for the water (14) and the lid for the dog food dispenser (22).

FIG. 3 is a front view of the invention (10) showing 3 of 4 separate parts, including the base (20) with a tray for the food (16) and a tray for the water (18) and one-half of the dispensing container, the one for food (12) and the lid for the dog food dispenser (22).

FIG. 4 is a side view of the invention (10) containing 4 separate parts, including the base (20) with a tray for the food (16) and a tray for the water (18) and the two halves of the dispensing jug, the one for food (12) and one for the water (14) and the lid for the dog food dispenser (22).

Figure 5:
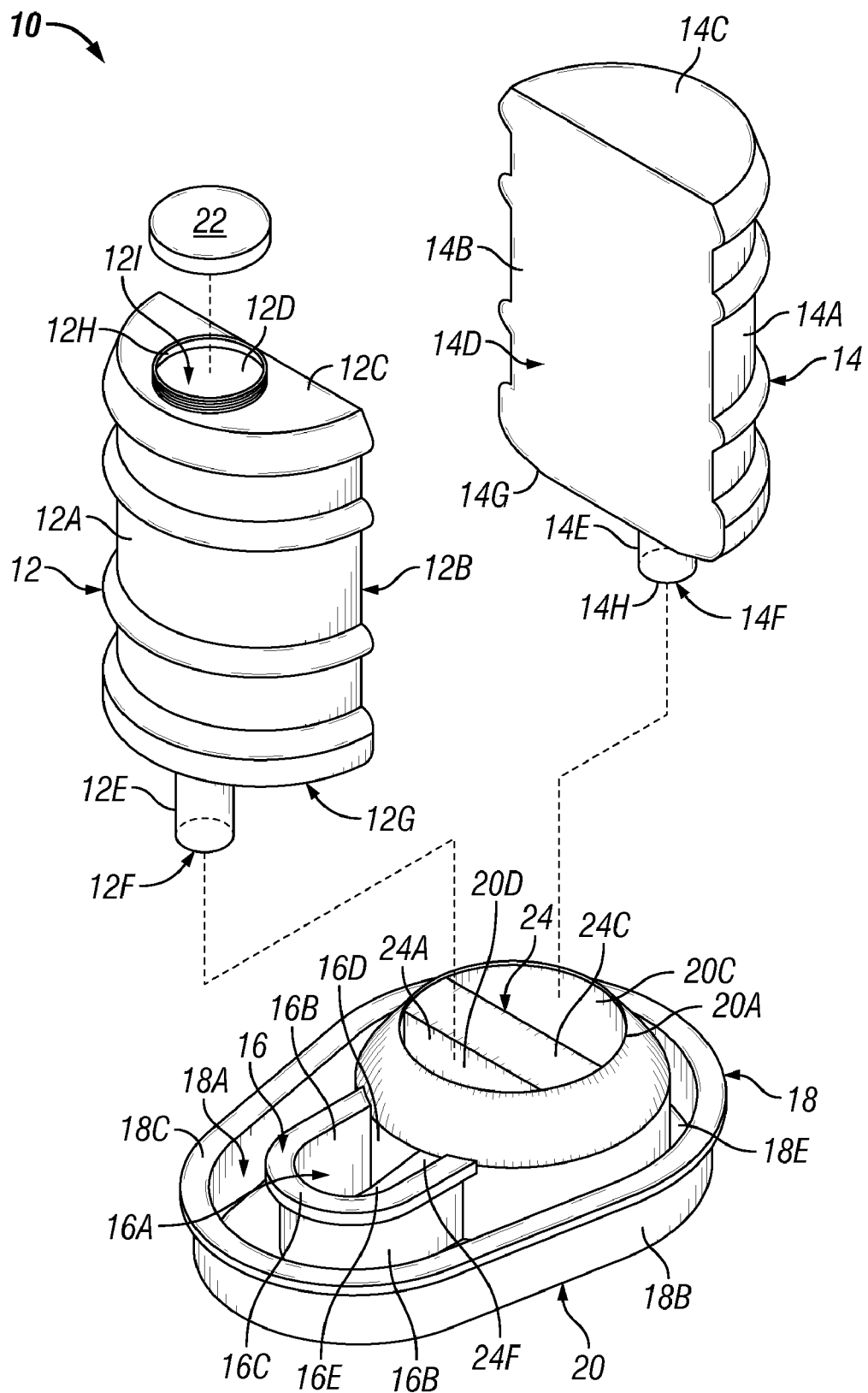
FIG. 5 illustrates an exploded perspective view of an embodiment of a combined animal food and water dispenser according the present invention.

FIG. 5 is an exploded perspective view of the invention (10) containing 4 separate parts, including the base (20) (Note: The dimensions of the base will be based on the size of the feeder and water container and will be determined due to design concerns, as well as physics) with a tray for the food (16) and a tray for the water (18) and the two halves of the dispensing jug, the one for food (12) and one for the water (14) (Note: The dispensing port on each half of the dispensing jug will be determined due to design concerns, as well as physics) and the lid for the dog food dispenser (22).

FIG. 6 is a rear view of the invention (10) showing the base (20) with a tray for the water (18) and one-half of the dispensing container, the one for water (14).

Referring again to FIGS. 1-6, the combination food and water dispenser (10) of the present invention comprises three basic parts: a food container (12) for storing and dispensing food on demand, a water container (14) for storing and dispensing water on demand and a base unit (20) for serving the dispensed food and water.

As depicted in the embodiment shown in FIGS. 1-6, the food container (12) generally comprises a food container front side (12a), food container back side (12b), food container top side (12c) and food container bottom side/shoulder (12g). The food container (12) has a food container interior space (12d), a food inlet (12i) for ease in filling the container with food (shown here located in the food container top side (12c)), and a food container neck (12e) with food container neck opening (12f) for discharging food out of the food container (12). In this depiction, the food container front side (12a) is shown as a shaped surface and the food container back side (12b) is shown as a flat surface so that the overall shape of the food container (12) in this embodiment is substantially that of a half-hollow cylinder. As will be understood by those with the benefit of this disclosure, other container shapes could suitably be employed. The food container opening (12i) preferably has a cap or lid (22) to seal it once the food has been placed into the container (12). The cap or lid (22) could be mounted over a lip structure (12h) wherein the cap (22) fit over the lip (12h) in mated fashion such as by employing mated threads on the cap and lip to create a threaded connection or the like. The container (12) could operate without any food inlet in the top surface, and instead rely on removing the food container (12) from the base (20d) and filling the food container (12) through its neck opening (12f), however, a suitably sized inlet (12i) located in the top of the container (12) provides a convenient way to refill the food container (12).

The water container (14) generally comprises a water container front side (14a), water container back side (14b), water container top side (14c) and water container bottom side/shoulder (14g). The water container (14) has a water container interior space (14d), and a water container neck (14e) with water container neck opening (14f) for discharging water out of the water container (14). In this depiction, the water container front side (14a) is shown as a shaped surface and the water container back side (14b) is shown as a flat surface so that the overall shape of the water container (14) in this embodiment is substantially that of a half-hollow cylinder. As will be understood by those with the benefit of this disclosure, other container shapes could suitably be employed.

In one embodiment, the shape half-cylinder shapes of the food container (12) and the water container (14) permit the two containers to mounted on the base (20) in a back-to-back fashion resembling a full cylindrical shape such as shown in FIG. 1. The containers (12, 14) can be separate or could be joined together, permanently attached or otherwise constructed as a unitary structure sharing a single dividing wall (where back sides (12b) and (14b) are the same structure.

The separate food and water containers (12, 14) or a unitary food/water container are mounted on the base (20). The base (20) generally comprises a water tray (18), a food tray (16) and base receiver (20e). The water tray (18) generally comprises a water bowl section (18a) for containing water within the space defined by the water bowl floor (18e) and the contiguous water bowl outer wall member (18b) which is substantially vertical, and may contain a water bowl lip (18c). The base receiver (20e) is attached to the water bowl floor (18e) in an island-like configuration so that it is surrounded by, but not in physical contact with, the water bowl outer wall member (18b). The base receiver (20e) comprises two separate chambers: a base water receiving chamber (20c) for receiving and housing the water container (14) and a base food receiving chamber (20d) for receiving and housing the food container (12) (or for receiving a unitary food/water container). In the embodiment depicted in FIGS. 1-6, the base receiver (20e) comprises a generally cylindrical outer wall having its lower end attached to the water bowl floor (18e), and at its upper end, a base upper lip or shoulder (20a). The interior space of this base receiver (20e) cylindrical shape (other shapes are possible, such as square, oval, rectangular, etc.) is vertically divided by a divider (24) having a divider front face (24a), divider back face (24b), divider top face (24c), divider left side wall (24d), divider right side wall (24e), and if desired, divider front sloped shoulder (24f) and divider back sloped shoulder (24g).

The food container (12) is mounted on the food receiving chamber (20d) portion of the base (20) so that the food container neck opening (12f) is within the interior of the food receiving chamber (20d). In this embodiment, the lower side or shoulder (12g) of the food container (12) rests on the base upper lip or shoulder (20a) and if desired can also be designed to rest on the divider top face (22). The interior of the base food receiving chamber (20d) is in fluid communication with the contents of the food container (12) when the food container (12) is mounted on the food receiving chamber (20d) portion of the base (20). The base food receiving chamber (20d) contains a food discharge opening (16d) leading into a food container bowl (16a). The food receiving chamber (20d) portion of the base (20) is sealed to prevent water present in the water receiving chamber (20c) or water bowl (18a) from intruding into the food receiving chamber (20d) or food bowl (16a). The food container bowl (16a) comprises a substantially vertical food bowl wall member (16b) defining a space along the water bowl floor (18e) that is sealed off on both sides of the food discharge opening (16) so that food may be discharged from the food container (12) into the food bowl (16a) of the food tray (16) without being introduced into the water bowl (18a). The food bowl floor (16e) is at substantially the same level as the water bowl floor (18e). The upper edge of the good bowl wall member (16b) can include a food bowl lip (16c). Preferably, the height of the food bowl wall member (16b) is at least as high as the height of the water tray wall member (18b), but preferably higher so that the defined water level in the water bowl (18a) will be lower than the top of the food bowl wall member (16b).

The water container (14) is mounted on the water receiving chamber (20c) portion of the base (20) so that the water container neck opening (14f) is within the interior of the water receiving chamber (20c). In this embodiment, the lower side or shoulder (14g) of the water container (14) rests on the base upper lip or shoulder (20a) and if desired can also be designed to rest on the divider top face (22). The base water receiving chamber (20c) is in fluid communication with the contents of the water container (14) when the water container is mounted on the water receiving chamber (20c) portion of the base (20), and contains a water discharge opening (20d) leading into the water container bowl (18a).

When the water container (14) is filled with water, and then placed into the water receiving chamber (20c), the water container neck bottom edge (14h) will define the water level of the water in the water bowl (18a). As the water flows by gravity out of the water container (14), though the water container neck (14e), out the water container neck opening (14f), into the water receiving chamber (20c), through the base water inlet (20b) and into the water bowl (18a), the water level in the water bowl will rise up to the point where the water container neck bottom edge (14h) becomes submerged, at which time the gravity flow of the water will cease until water is consumed by the pet or evaporates, at which time, the water level will be replenished by further gravity flow of water from the water container (14). This process of auto gravity filling of water bowls from inverted water bottle sources is well understood in the art and can be accomplished in many different ways to advantage in the present invention.

When the food container (12) is filled (or refilled via capped opening 12d) with food, and placed into the food receiving chamber (20d), food stored within the food container (14) will travel downward by gravity, through the food container neck (12e), out of the food container neck opening (12f), through the food discharge opening (16d) and into the food bowl (16a).

The water in the water bowl (18a) not only serves as a drinking water source for the animal or pet, but also serves as a moat to surround the food bowl (16a) and base (20) with water to prevent or inhibit crawling insects from accessing the food in the food bowl (16a), base food receiving chamber (20d) and food container (12).

Although a gravity-based, on-demand system has been described for providing food and water into the respective food and water bowls, other technologies, such as electronic dispensers and portion control dispensers could be employed.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention. Further modifications and alternative embodiments of this invention will be apparent to those skilled in the art in view of this specification.

I claim:

1. A combination food and water dispenser for pets comprising:
   (a) a food container capable of receiving, storing and dispensing dry pet food comprising a food container outer surface, a food container interior space, a food container top side, a food container bottom side, and a first food container opening located on the food container bottom side to permit entry into or egress from the food container interior space of the dry pet food;
   (b) a water container capable of receiving, storing and dispensing water comprising a water container outer surface, a water container interior space, a water container top side, a water container bottom side, and a water container opening to permit entry into or egress from the water container interior space of water;
   (c) a water bowl having a water bowl floor and a contiguous substantially vertical water bowl outer wall member fixably attached to the water bowl floor member to create a water reservoir capable of receiving and holding dispensed water therein at a constant water level;

(d) a food bowl having a food bowl floor and a contiguous substantially vertical food bowl outer wall member fixably attached to the water bowl floor member to create a food reservoir capable of receiving and holding dispensed food therein, the food bowl being located within the water bowl in a position that does not permit the food bowl to contact the water bowl outer wall member, wherein the food bowl wall member has a height greater than that of the water level in the water bowl; and (e) a vertically extending base receiver unit attached to the water bowl floor in a position that does not permit the base receiver unit to contact the water bowl outer wall member, the base receiver unit comprising:
  i. a base water receiving chamber for receiving and housing the water container and for directing water, via gravity flow, from the water container into the water bowl, and
  ii. a base food receiving chamber for receiving and housing the food container and for directing food, via gravity flow, from the first food container opening into the food bowl.

2. The combination food and water dispenser of claim 1 wherein the food container further comprises a second food container opening located on the food container top side and a removable lid to cover the second food container opening, to permit dry food to be added to the food container.

3. The combination food and water dispenser of claim 1 wherein the first food container opening further comprises a food container neck with food container neck opening for discharging food out of the food container;
  wherein the food container has a food container front side convex shaped surface and a food container back side flat surface so that the overall shape of the food container is substantially that of a half-hollow cylinder;
  wherein the water container opening further comprises a water container neck with water container neck opening;
  wherein the water container has a water container front side convex shaped surface and a water container back side flat surface so that the overall shape of the water container is substantially that of a half-hollow cylinder;
  wherein the food container and the water container are housed, back side-to-back side to resemble a full cylinder, when the water container and the food container are housed in the base receiver.

4. The combination food and water dispenser of claim 1 wherein the food container and the water container are attached together in a unitary construction that can be housed in or removed from the base receiver unit.

5. The combination food and water dispenser of claim 1 wherein the top of the water bowl wall member further comprises a water bowl lip and the top of the food bowl member further comprises a food bowl lip.

* * * * *